(12) United States Patent
Bereznicki et al.

(10) Patent No.: US 8,360,408 B2
(45) Date of Patent: Jan. 29, 2013

(54) MULTI-TOOL POSITIONER FOR FLEXIBLE MANUFACTURING OF FIXTURE JOINING COMPONENTS

(75) Inventors: Rodney E. Bereznicki, Clarkston, MI (US); Scott M. Alore, Shelby Township, MI (US); James L. Pacyga, Washington, MI (US); Alfred E. Ruppel, Troy, MI (US); Kenneth W. Taylor, New Baltimore, MI (US); Leonard A. Zanger, Bloomfield Hills, MI (US)

(73) Assignee: KUKA Systems Corporation North America, Sterling Heights, MI (US)

( * ) Notice: Subject to any disclaimer, the term of this patent is extended or adjusted under 35 U.S.C. 154(b) by 481 days.

(21) Appl. No.: 12/560,935

(22) Filed: Sep. 16, 2009

(65) Prior Publication Data

US 2010/0065999 A1 Mar. 18, 2010

Related U.S. Application Data

(60) Provisional application No. 61/097,383, filed on Sep. 16, 2008.

(51) Int. Cl.
| | |
|---|---|
| *B23Q 3/18* | (2006.01) |
| *B66B 5/04* | (2006.01) |
| *B66B 5/16* | (2006.01) |
| *B66B 5/28* | (2006.01) |
| *B60T 8/72* | (2006.01) |
| *F16D 65/56* | (2006.01) |

(52) U.S. Cl. .......... 269/59; 187/373; 187/352; 187/343; 188/181 T; 188/196 BA

(58) Field of Classification Search .................... 269/59; 187/373, 352, 343, 50; 188/181 T, 196 BA, 188/326, 79.56, 250 B
See application file for complete search history.

(56) References Cited

U.S. PATENT DOCUMENTS

| | | | | |
|---|---|---|---|---|
| 2,298,167 | A | * | 10/1942 | Rissler .......................... 187/352 |
| 4,083,432 | A | * | 4/1978 | Lusti ............................. 187/373 |
| 4,220,227 | A | * | 9/1980 | Kluger .................. 188/196 BA |
| 4,441,589 | A | * | 4/1984 | Stevens ...................... 188/181 T |
| 4,565,264 | A | * | 1/1986 | Kunii ............................. 187/373 |
| 4,685,861 | A | | 8/1987 | Huetsch |
| 5,740,891 | A | * | 4/1998 | Song ............................. 188/326 |
| 6,068,442 | A | | 5/2000 | Flemmer et al. |
| 2006/0163007 | A1 | | 7/2006 | Bukowski et al. |

FOREIGN PATENT DOCUMENTS

| | | |
|---|---|---|
| DE | 35 04 233 A1 | 11/1986 |
| EP | 0 235 305 A1 | 9/1987 |

OTHER PUBLICATIONS

European Patent Office; Search Report and Written Opinion in International Patent Application No. PCT/US2009/057154 dated Jan. 7, 2010, 12 pages.

* cited by examiner

*Primary Examiner* — Lee D Wilson
*Assistant Examiner* — Alvin Grant
(74) *Attorney, Agent, or Firm* — Wood, Herron & Evans, LLP

(57) ABSTRACT

A tooling fixture positioning system for securing automotive body part components to create an automotive body. The tooling fixture positioning system comprises a plurality of pivot joint assemblies and link arms coupled together to facilitate supporting tooling fixtures in desired positions and orientations. Each pivot joint assembly includes a brake that selectively engages and disengages the pivot joint assembly for rotation about a respective axis.

1 Claim, 7 Drawing Sheets

MULTI-TOOL POSITIONER FOR FLEXIBLE MANUFACTURING OF FIXTURE JOINING COMPONENTS

CROSS-REFERENCE TO RELATED APPLICATIONS

This application claims the benefit of priority to U.S. Provisional Patent Application Ser. No. 61/097,383 filed on Sep. 16, 2008 (pending), the disclosure of which is incorporated by reference herein in its entirety.

TECHNICAL FIELD

The present invention relates generally to tools and fixtures used in an automotive assembly line, and more particularly to tools and fixtures for supporting a variety of component parts at a variety of positions and orientations.

BACKGROUND

In the automotive vehicle manufacturing industry, it is customary to install various parts onto a fixture or an end effector frame of a robotic manipulator to produce a vehicle sub assembly or full body capsule assembly. The vehicle assembly process starts with sub assembly fixtures or tooling cells that require location features to address geometric control of the vehicle build. In this sub assembly scenario and similar applications, a multi-tool positioner unit can be used to support multiple tooling arrangements to allow more than one type of vehicle sub assembly to be processed through the fixture or tooling cell, thereby making the fixture or tooling cell flexible. Likewise, mainline assembly tooling can also be made flexible by using multi-tool positioner units. For techniques of marrying an automotive body parts, see U.S. patent application Ser. Nos. 11/112,599 and 60/632,117, which are assigned to the assignee of this application and incorporated by reference herein in their entirety.

Multi-tool positioners are used to set geometry or to assist in securing automotive body parts so that the general operating process can be performed to create a part assembly that meets specifications. Typically as many as about twelve multi-tool positioner units may be used in a fixture and pallet tooling, depending on the parts being assembled. In use, an operator (or automatic equipment) loads an automotive component part, for example, a wheel house inner or even an entire underbody assembly, onto the pallet/fixture. The multi-tool positioner units hold the component parts in position. In the event that a different specified part is entered in to the system the multi-tool positioner units can be manipulated to the required location to accommodate the entering part.

The multi-tool positioner unit must be able to be moved in three orthogonal directions to achieve the required flexibility. The unit is adjustable through a braking system. The braking system may be released to reconfigure the multi-tool positioner unit to a different required position. More particularly, the multi-tool positioner units can be repositioned by engaging socket type connections, either manually or by using robotic end of arm tooling. From any given position, the brakes may be released individually or sequentially to obtain the next desired position. Once the next position is obtained, the manual device or robotic end of arm tooling will engage the brake to hold the multi-tool positioner unit in that position. The multi-tool positioner units must also accommodate locational tolerances required to compensate for manufacturing tolerances inherent in the various body parts and in the multi-tool positioner unit itself, while holding the tool in the desired position. Moreover, the brakes should be able to withstand minor collisions or pressure exerted by external forces.

Conventional multi-tool positioner units generally include spherical bearings in the lower pivot assembly to provide positional compliance and/or locational tolerance. Upper pivot assemblies hold a desired position with surface contact bearing method utilizing coated fitted bearings.

SUMMARY

An apparatus for securing automotive body part components to create an automotive body is disclosed. The apparatus comprises a plurality of pivot joint assemblies and link arms coupled together to facilitate supporting tooling fixtures in desired positions and orientations. In one aspect, a multi-tool positioner includes four pivot joint assemblies, each having a dedicated brake, and a mount face for securing custom bracket fixtures. Each brake may be engaged or disengaged by an actuator.

The pivot joint assemblies may be manually or automatically actuated to engage and disengage the brakes. Moreover, the brakes can be actuated individually or simultaneously to facilitate reconfiguring the multi-tool positioner to a desired position.

These and other features and advantages of the present invention will become more readily apparent with reference to the following detailed description, taken in conjunction with the drawings herein, in which:

DETAILED DESCRIPTION

Figure 1:
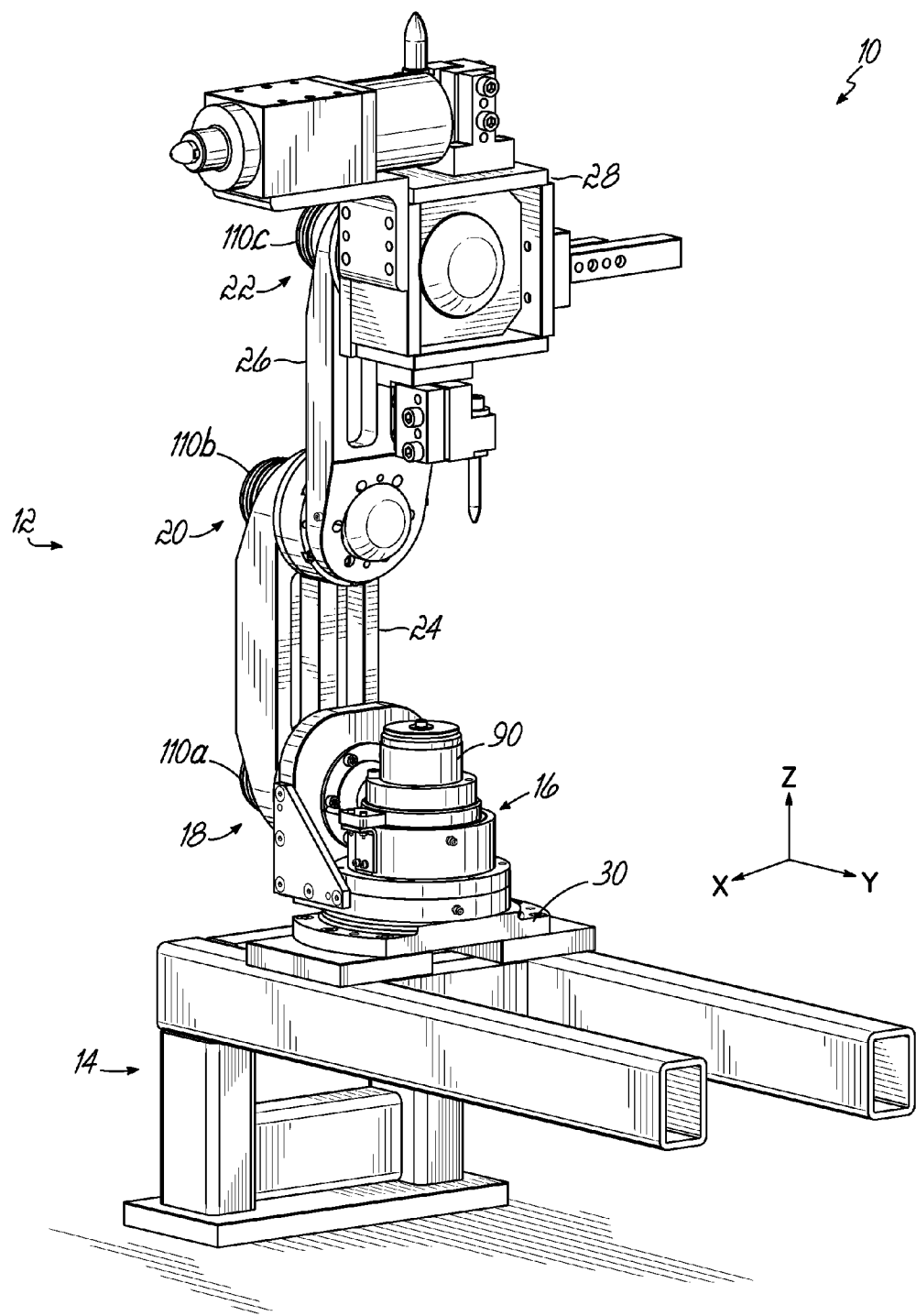
FIG. 1 is a perspective view of a tooling fixture system including a multi-tool positioner in accordance with the present disclosure.

FIG. 1 depicts an exemplary tooling fixture positioning system 10 which may be used, for example, to support build components in a desired position and orientation in an automotive manufacturing line for assembly onto an automobile. The system 10 includes an exemplary multi-tool positioner 12, in accordance with the present disclosure, mounted to a support frame 14.

Figure 2:
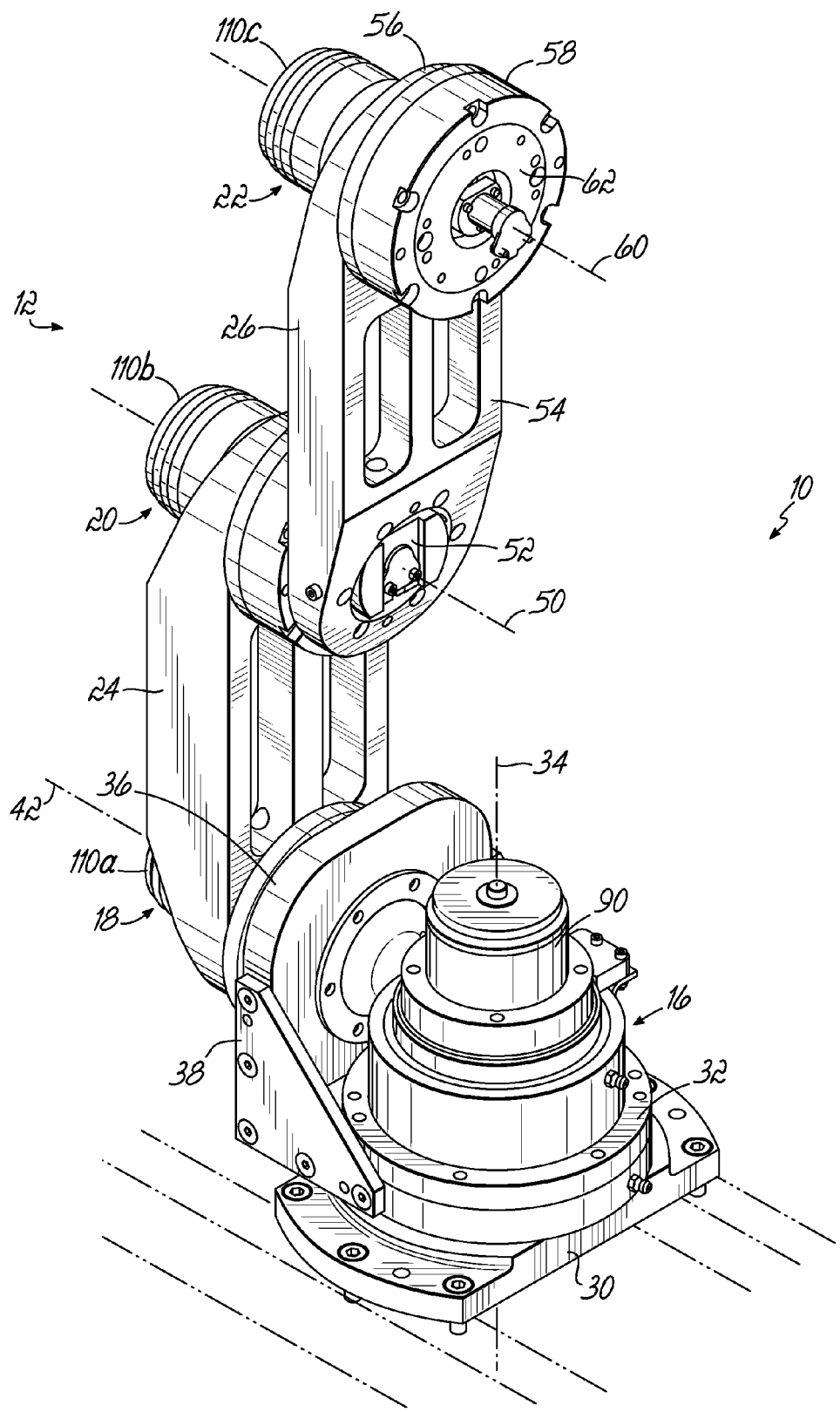
FIG. 2 is a perspective view of the multi-tool positioner of FIG. 1.
Figure 3A:
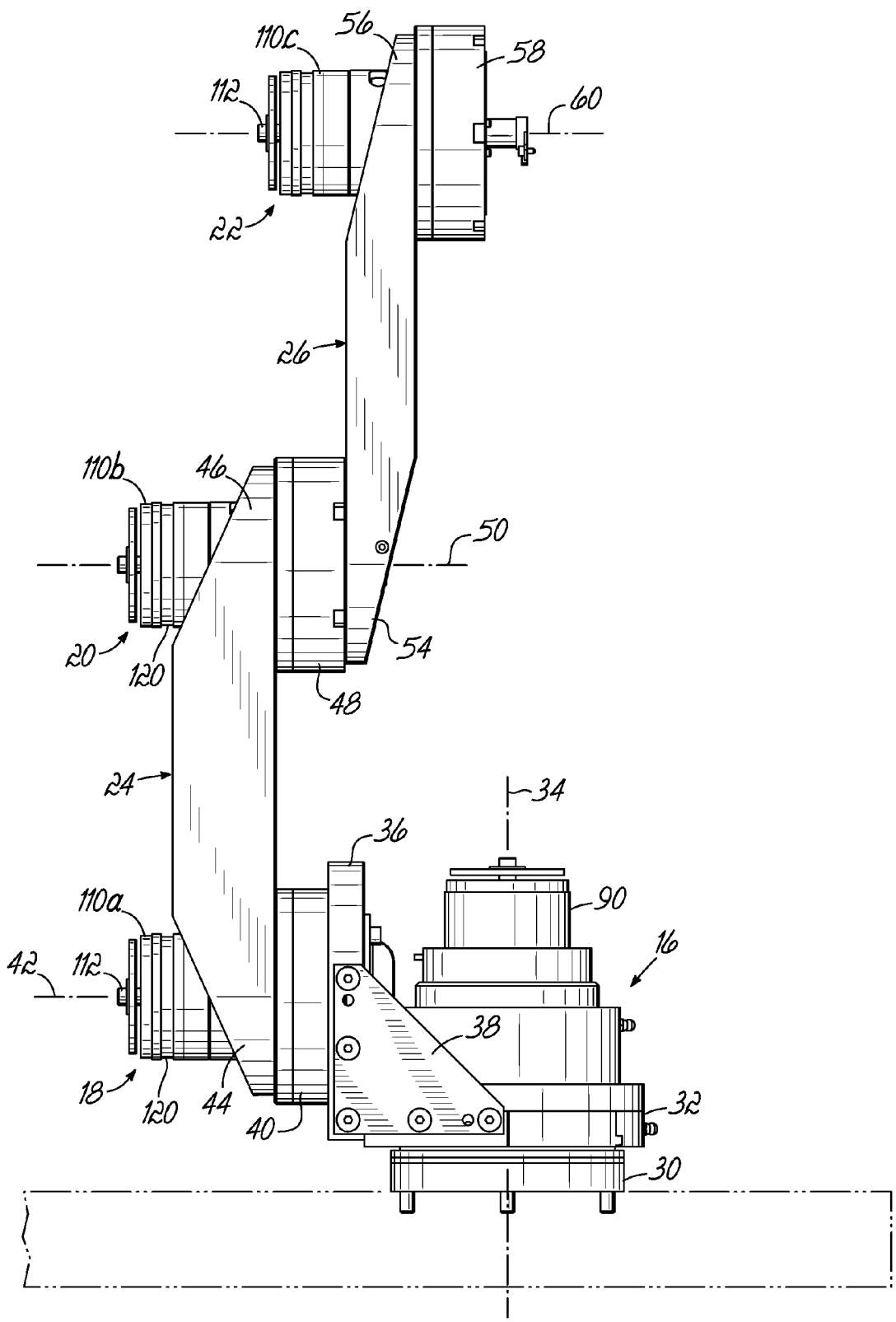
FIG. 3A is a side elevation view of the multi-tool positioner of FIG. 2.
Figure 3B:
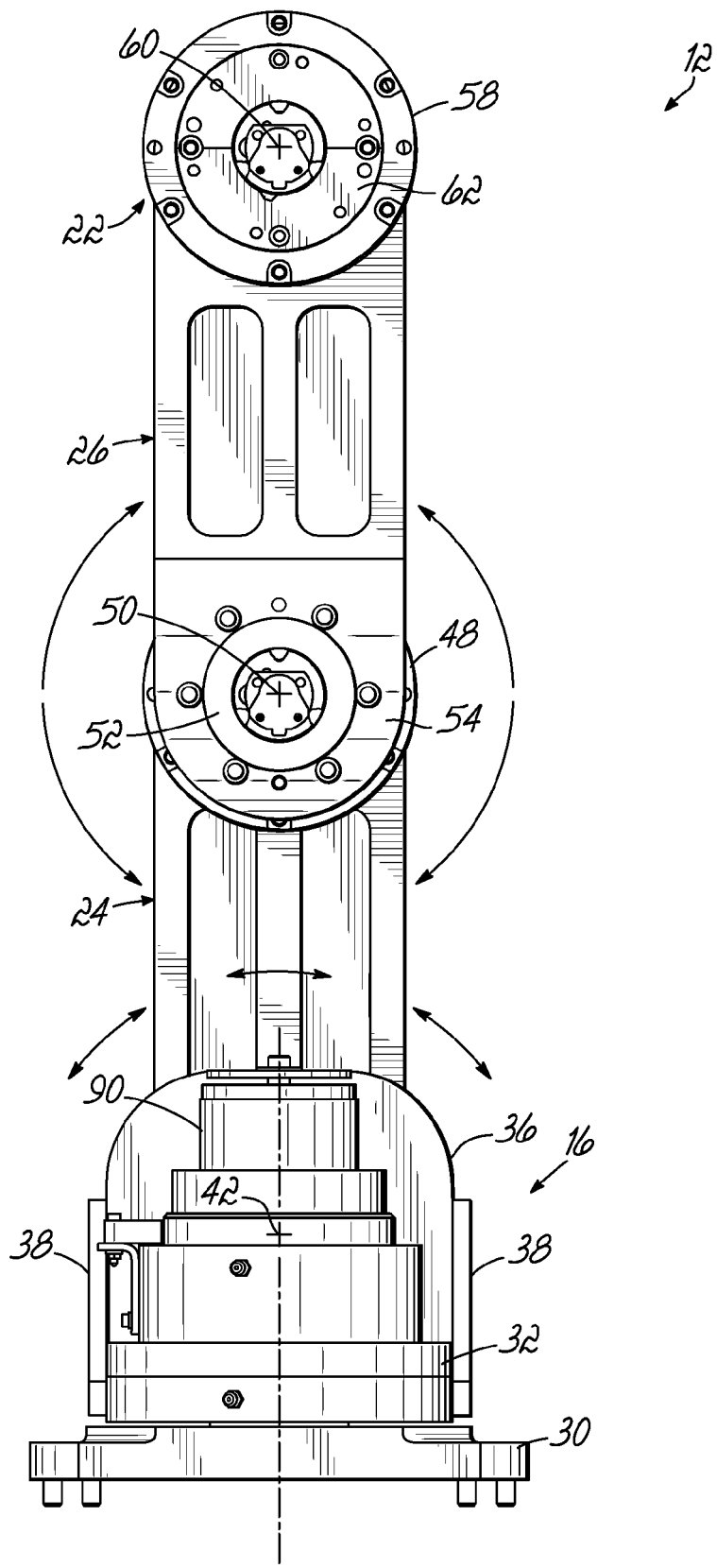
FIG. 3B is a rear elevation view of the multi-tool positioner of FIG. 2.

With continued reference to FIG. 1, and referring further to FIGS. 2, 3A, and 3B, the multi-tool positioner 12 comprises a plurality of pivot joint assemblies 16, 18, 20, 22 and link arms 24, 26 coupled together to support a tooling fixture 28 and to position the tooling fixture 28 at a desired location within a three-dimensional space defined by three orthogonal axes X, Y, Z. A first pivot joint assembly 16 is secured at a desired position to the support frame 14 by a mounting base 30. A pivot plate 32 is coupled to the mounting base 30 for rotation about a first axis 34. In the illustrated embodiment, the first axis 34 is oriented in a generally vertical direction, although it will be appreciated that the first axis 34 may alternatively be oriented in various other directions.

A second pivot joint assembly 18 is secured to a second mounting plate 36 that is in turn coupled to the pivot plate 32 of the first pivot joint assembly 16 by a pair of gusset plates 38 secured therebetween. The second pivot joint assembly 18 includes an outer hub 40 that is selectively rotatable about a second axis 42 that is generally orthogonal to the first axis 34. A first link arm 24 has a first terminal end 44 coupled to the outer hub 40 of the second pivot joint assembly 18, and a second distal end 46 coupled to an outer hub 48 of a third pivot joint assembly 20. The outer hub 48 of the third pivot joint assembly 20 is selectively rotatable about a third axis 50 that is generally parallel to the second axis 42 of the second pivot joint assembly 18. An inner hub 52 of the third pivot joint assembly 20 is coupled to a first terminal end 54 of a second link arm 26, and the second terminal end 56 of the second link arm 26 is coupled to the outer hub 58 of a fourth pivot joint assembly 22. The outer hub 58 of the fourth pivot joint assembly 22 is selectively rotatable about a fourth axis 60 that is generally parallel to the second and third axes 42, 50 of the second and third pivot joint assemblies 18, 20. An inner hub 62 of the fourth pivot joint assembly 22 is adapted to receive and support a tooling fixture, such as the tooling fixture 28 depicted in FIG. 1. It will be appreciated, however, that various other configurations of tooling fixtures may alternatively be coupled to the inner hub 62 of the fourth pivot joint assembly 22 to support a variety of build components on the multi-tool positioner 12.

Figure 4A:
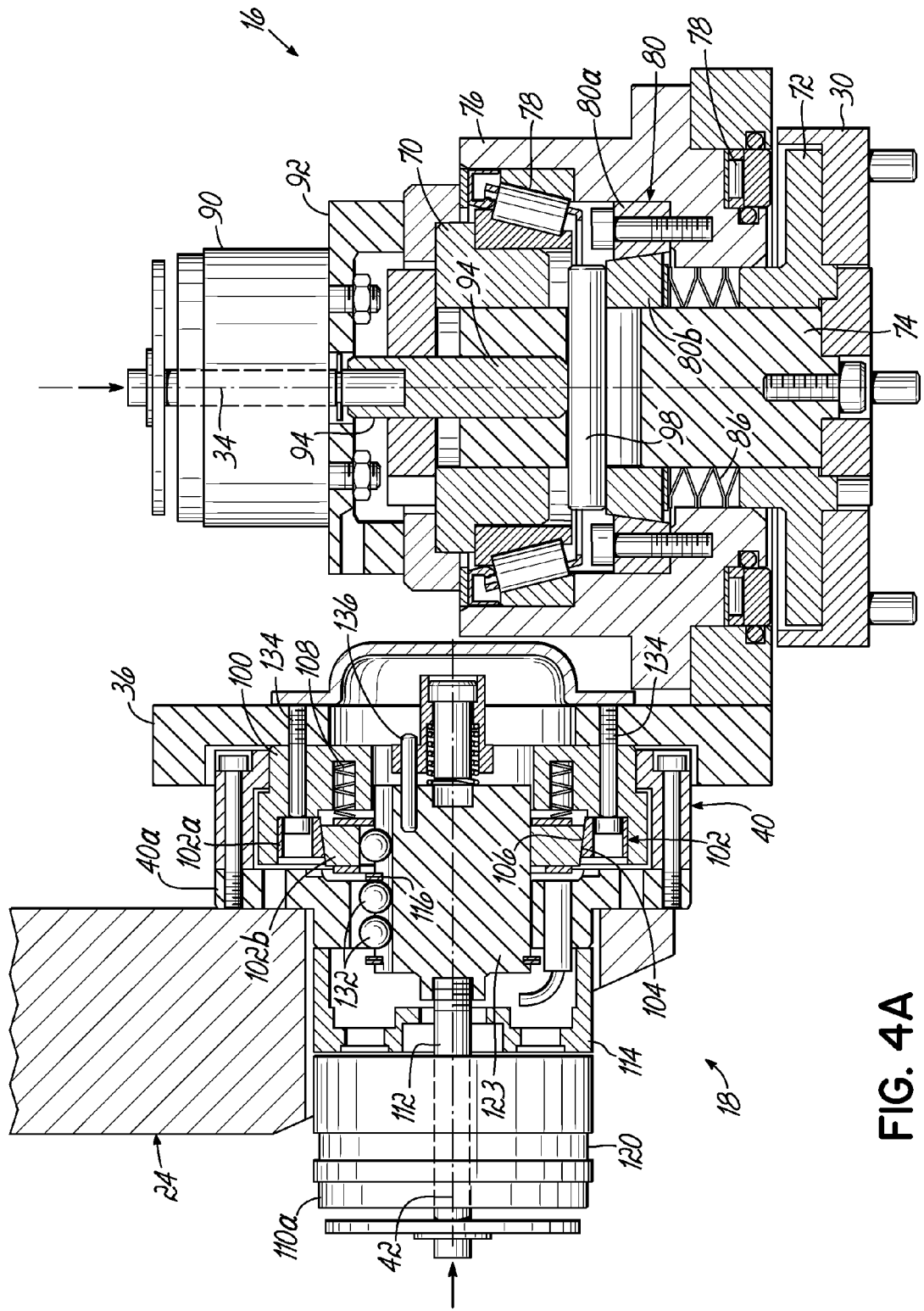
FIG. 4A is a partial cross-sectional view of a portion of the multi-tool positioner of FIG. 2, depicting a first pivot joint assembly in an engaged condition.
Figure 4B:
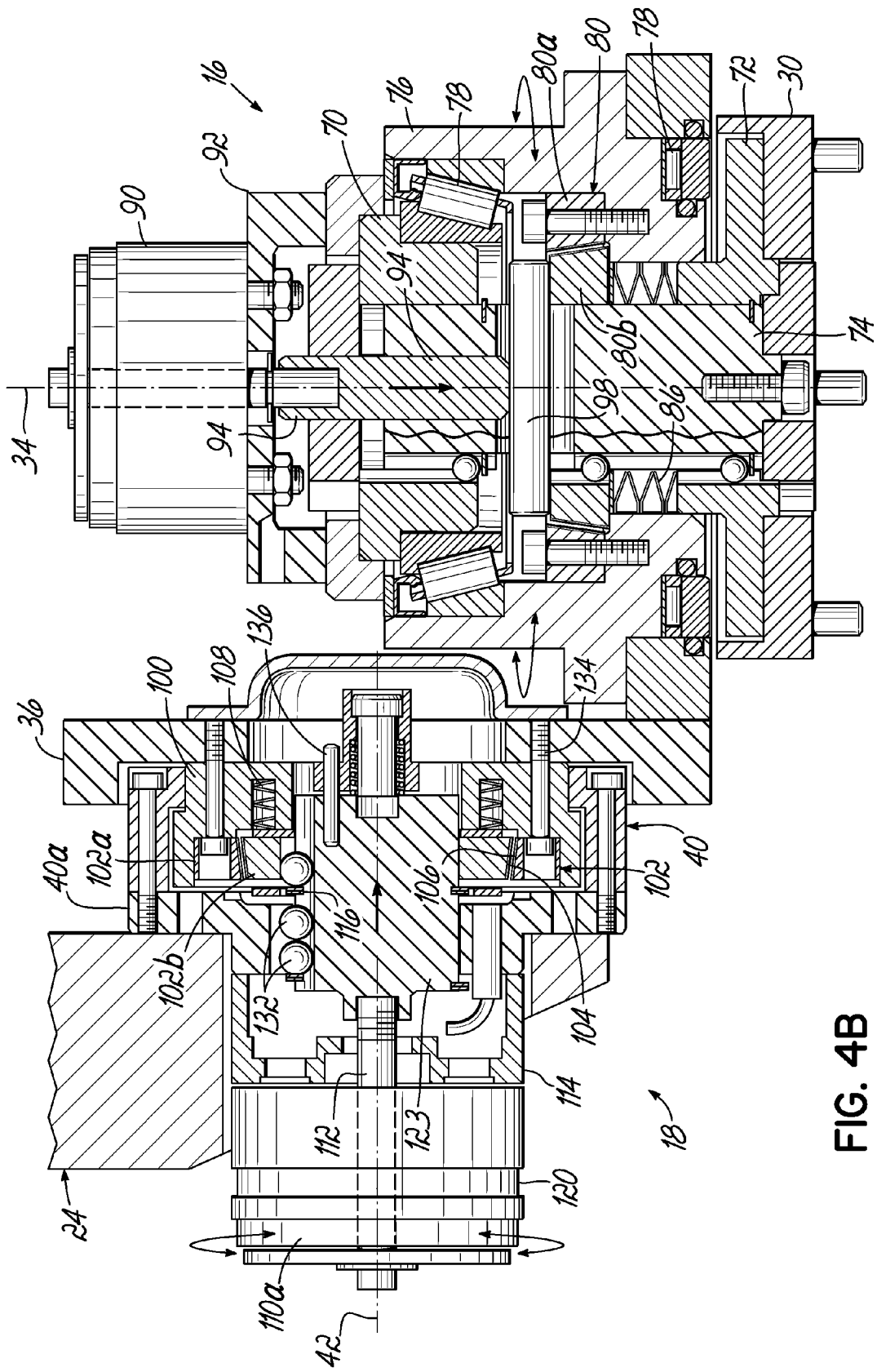
FIG. 4B is a partial cross-sectional view of a portion of the multi-tool positioner of FIG. 2, similar to FIG. 4A, depicting the first pivot joint assembly in a disengaged condition.

Referring now to FIGS. 4A and 4B, the pivot joint assemblies will be described in more detail. The first pivot joint assembly 16 includes first and second outer hubs 70, 72 interconnected by a central shaft 74. The second outer hub 72 is coupled to the base plate 30 that secures the first pivot joint assembly 16 to the support frame 14. An inner hub 76 is disposed between the first and second outer hubs 70, 72 and is carried on bearings 78 for rotational movement relative to the first and second outer hubs 70, 72. The first pivot joint assembly 16 further includes a locking spline brake 80 for locking the inner hub 76 against rotation relative to the first and second outer hubs 70, 72. The spline brake 80 includes a brake drum 80a fixed to the inner hub 76, and a brake shoe 80b fixed to the central shaft 74. The outer radial surface 82 of the brake shoe 80b and the corresponding inner radial surface of the brake drum 80a include complementary-shaped spline teeth that prevent rotation of the inner hub 76 relative to the first and second outer hubs 70, 72 when the spline teeth are engaged. The brake shoe 80b is biased into engagement with the brake drum 80a by a spring 86 to thereby prevent rotational movement of the inner hub 76 relative to the first and second outer hubs 70, 72.

The first pivot joint assembly 16 further includes an actuator 90 coupled to the first outer hub 70 by an adapter plate 92. The actuator 90 has a plunger 94 that is movable in a direction along the first axis 34. Upon actuation, the plunger 94 moves in a direction such that a pusher bar 98 engages the brake shoe 80b and moves the brake shoe 80b against the bias of the spring 86 to disengage the brake shoe 80b from the brake drum 80a, whereafter the inner hub 76 is free to rotate relative to first and second outer hubs 70, 72.

Figure 5:
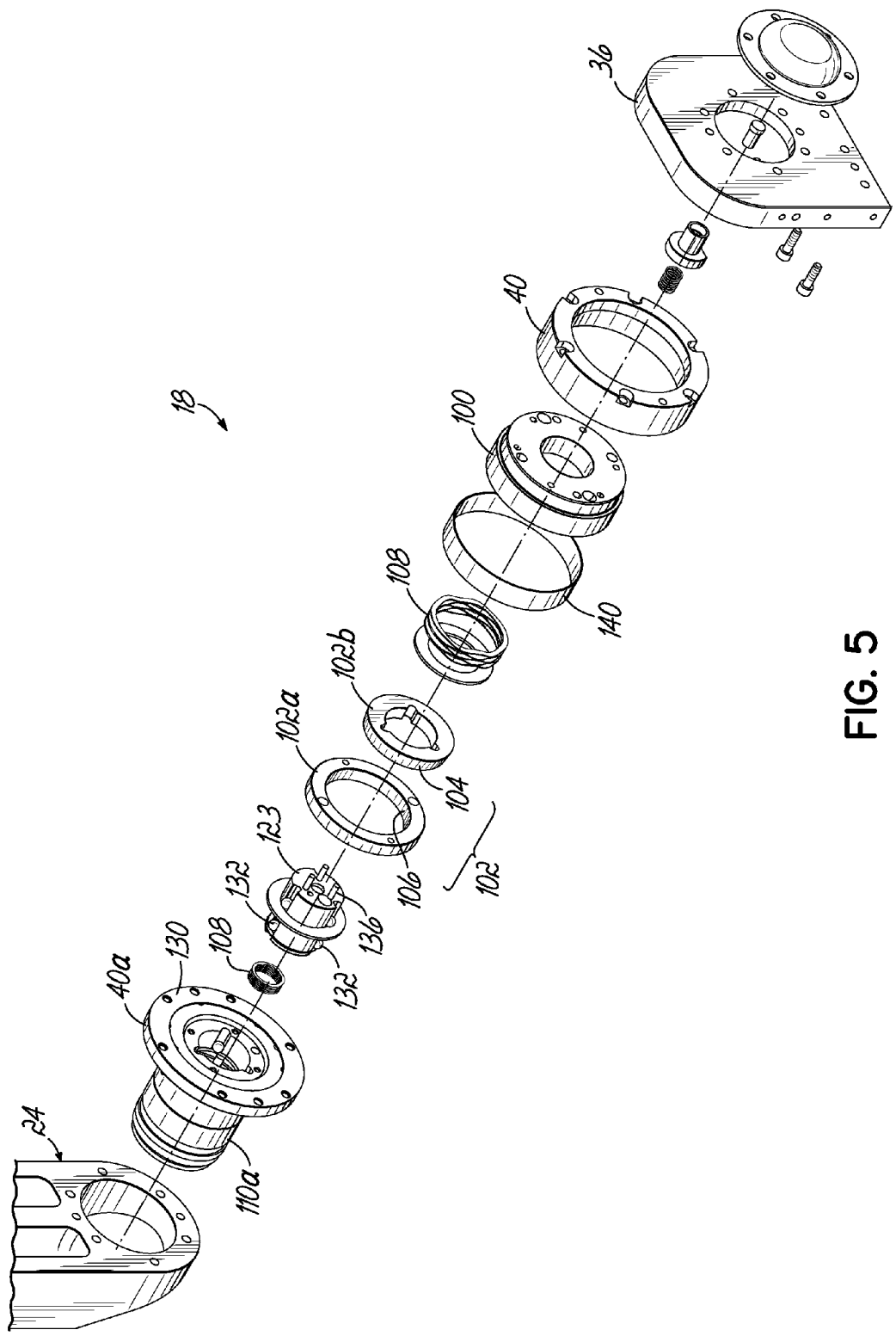
FIG. 5 is an exploded perspective view of the second pivot joint assembly of FIG. 4A.

The second pivot joint assembly 18 comprises an inner hub 100 coupled to the second mounting plate 36 and an outer hub 40 coupled to the inner hub 100 for relative rotational movement with respect to the inner hub 100. A spline cone brake 102 has a brake drum 102a fixed to the inner hub 100, and a brake shoe 102b coupled to a central shaft 123. The central shaft 123 is coupled to a hub plate 40a of the outer hub 40. Exemplary brake shoe 102b and exemplary brake drum 102a is depicted in FIG. 5. It will be appreciated that various other configurations of brake shoes and brake drums could alternatively be used. The outer radial surface 104 of the brake shoe 102b and the inner radial surface 106 of the brake drum 102a include corresponding spline teeth configured to engage one another such that when the teeth are engaged the outer hub 40 and central shaft 123 are locked against rotation relative to the inner hub 100. A spring 108 biases the brake shoe 102b into engagement with the brake drum 102a.

The second pivot joint assembly 18 further includes an actuator 110a having a plunger 112 that is movable in a direction along the second axis 42. The actuator 110a is coupled to the outer hub 40 by an adapter plate 114. Upon actuation, the plunger 112 moves in a direction to engage the brake shoe 102b with a push ring 116 that is coupled to central shaft 123 and thereby move the brake shoe 102b in a direction against the bias force of the spring 108 such that the corresponding spline teeth on the brake shoe 102b and the brake drum 102a become disengaged. After the spline teeth on the brake shoe 102b and brake drum 102a become disengaged, the outer hub 40 and central shaft 123 may be rotated relative to the inner hub 100.

FIG. 5 is an exploded perspective view of the second pivot joint assembly 18, further depicting the components discussed above and including thrust bearing 130, ball bearings 132, fasteners 134, dowels 136, spacer 138, bearing 140, and retainer 142.

The third and fourth pivot joint assemblies 20, 22 are constructed in a manner similar to the second pivot joint assembly 18 discussed above, and are actuated by actuators 110b and 110c. The details of the third and fourth pivot joint assemblies 20, 22 are therefore not repeated. The actuators 90, 110a, 110b, 110c shown and described herein may be pneumatic actuators, electric motors, or any other type of actuator suitable to move the respective plungers and thereby selectively disengage the respective brake shoes from the brake drums. Actuators 90, 110a, 110b, 110c may also be adapted to be manually actuated to disengage the brake shoes from the brake drums when it is desired to reposition the tooling fixture 28. For example, the second pivot joint assembly 110a depicted in FIGS. 4A and 4B includes a manual release groove 120. By applying force to the plunger 112 and release groove 120, the push ring 116 moves brake shoe 102b against the bias of spring 108, thereby disengaging brake shoe 102b and brake drum 102a as described above. Actuators 90, 110b, and 110c may be similarly constructed.

The first end 44 of the first link arm 24 is coupled to the outer hub 40 of the second pivot joint assembly 18, and the second end 46 of the first link arm 24 is coupled to the outer hub 48 of the third pivot joint assembly 20. Likewise, the first end 54 of the second link arm 26 is coupled to the inner hub 52 of the third pivot joint assembly 20, and the second end 56 of the second link arm 26 is coupled to the outer hub 58 of the fourth pivot joint assembly 22. In operation, the actuators 90, 110a, 110b, 110c of the first, second, third, and fourth pivot joint assemblies 16, 18, 20, 22 may be actuated, individually or simultaneously, to release the respective spline brakes whereby the hubs of the respective pivot joint assemblies 16, 18, 20, 22 may be selectively rotated to position and orient a tooling fixture 28 coupled to the fourth pivot joint assembly 22 at a desired location and orientation for supporting a build component.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. An apparatus for supporting a fixture in a desired position, the apparatus comprising:
    a first pivot joint assembly including a first hub rotatable about a first axis;
    a second pivot joint assembly coupled to said first pivot joint assembly for selective positioning of said second pivot joint assembly about said first axis, said second pivot joint assembly including a second hub rotatable about a second axis orthogonal to said first axis;
    a third pivot joint assembly including a third hub rotatable about a third axis, said third axis being parallel to said second axis;
    a link arm coupled between said second hub and said third hub;
    said first, second, and third pivot joint assemblies each comprising:
        a brake drum having first teeth,
        a brake shoe having second teeth complementary to said first teeth of said brake drum,
        a biasing member biasing engagement between said first teeth and said second teeth,
        each said hub coupled to a respective one of said brake drum and said brake shoe such that said hub is fixed against rotation when said first teeth are in engagement with said second teeth, and
        an actuator operative to move one of said brake shoe or said brake drum relative to the other of said brake shoe or said brake drum for selective disengagement of said first and said second teeth.

* * * * *